United States Patent
Cheng et al.

(10) Patent No.: US 9,575,562 B2
(45) Date of Patent: Feb. 21, 2017

(54) USER INTERFACE SYSTEMS AND METHODS FOR MANAGING MULTIPLE REGIONS

(71) Applicant: SYNAPTICS INCORPORATED, Santa Clara, CA (US)

(72) Inventors: Ethan Cheng, Cupertino, CA (US); Anna Ostberg, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 293 days.

(21) Appl. No.: 13/668,399

(22) Filed: Nov. 5, 2012

(65) Prior Publication Data

US 2014/0125598 A1     May 8, 2014

(51) Int. Cl.
  G06F 3/01     (2006.01)
  G06F 3/0488   (2013.01)

(52) U.S. Cl.
  CPC ........... G06F 3/017 (2013.01); G06F 3/04883 (2013.01)

(58) Field of Classification Search
  CPC .............................. G06F 3/017; G06F 3/04883
  See application file for complete search history.

(56) References Cited

U.S. PATENT DOCUMENTS

| | | | |
|---|---|---|---|
| 2003/0221876 A1* | 12/2003 | Doczy et al. | 178/18.01 |
| 2005/0052427 A1 | 3/2005 | Wu et al. | |
| 2010/0031203 A1 | 2/2010 | Morris et al. | |
| 2010/0151946 A1* | 6/2010 | Wilson et al. | 463/36 |
| 2010/0182247 A1* | 7/2010 | Petschnigg et al. | 345/173 |
| 2010/0231522 A1 | 9/2010 | Li | |
| 2011/0093821 A1* | 4/2011 | Wigdor et al. | 715/863 |
| 2011/0267265 A1* | 11/2011 | Stinson | 345/157 |
| 2012/0197857 A1* | 8/2012 | Huang et al. | 707/706 |
| 2013/0006616 A1* | 1/2013 | Wakaki et al. | 704/200 |
| 2013/0174100 A1* | 7/2013 | Seymour et al. | 715/863 |
| 2013/0321462 A1* | 12/2013 | Salter et al. | 345/633 |

OTHER PUBLICATIONS

Rekimoto, Jun, "GestureWrist and GesturePad: Unobtrusive Wearable Interaction Devices", Interaction Laboratory, Sony Computer Science Laboratories, Inc., 2001, pp. 1-7, Tokyo, Japan.
Harrison, C. et al., "OmniTouch: Wearable Multitouch Interaction Everywhere", UIST'11, Oct. 16-19, 2011, Santa Barbara, CA, USA.
Harrison, C. et al, "Skinput: Appropriating the Body as an Input Surface", CHI 2010, Apr. 10-15, 2010, Atlanta, GA, USA.

* cited by examiner

*Primary Examiner* — Andrew Sasinowski
(74) *Attorney, Agent, or Firm* — Osha Liang LLP

(57) ABSTRACT

A user interface system includes a plane registration module configured to identify a first plane within an environment, and a gesture and posture recognition (GPR) module configured to observe a first allocation gesture, a second allocation gesture, a first modal gesture, a second modal gesture, and a third modal gesture within the environment. A region definition module is configured to determine a first region comprising a first portion of the first plane based on the first allocation gesture, and to determine a second region comprising a second portion of the first plane based on the second allocation gesture. A mode determination module is configured to determine different interaction modes for the various regions. A visual feedback module is configured to provide visual feedback associated with a parameter of the first region.

16 Claims, 8 Drawing Sheets

USER INTERFACE SYSTEMS AND METHODS FOR MANAGING MULTIPLE REGIONS

FIELD OF THE INVENTION

This invention generally relates to electronic devices, and more specifically relates to user interfaces associated with such electronic devices.

BACKGROUND OF THE INVENTION

Recent years have seen an increased interest in advanced user interfaces, particularly those used in connection with personal computers, tablet computers, smart-phone devices, and other electronic systems. Input devices often used in connection with such systems include proximity sensor devices (also commonly called touchpads or touch sensor devices). A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers).

It is sometimes desirable to provide a "virtual" user interface experience through the use of interface components that mimic the operation of physical user interface devices such as touchpads, keyboards, and the like. Such virtual user interfaces might observe the gestures and/or the postures made by a user's body (e.g., the user's hand) in a two-dimensional or three-dimensional space.

Presently known virtual user interfaces are unsatisfactory in a number of respects. For example, user interfaces that make use of three-dimensional space are seen as fatiguing and ergonomically inefficient. Furthermore, real-time interpretation of gestures and postures in three dimensions is computationally difficult and can lead to misinterpreting a user's actions—i.e., reading unintentional gestures as intentional gestures. This is often referred to as the "live-mic" problem.

Accordingly, there is a need for improved virtual user interfaces that address these and other limitations of the prior art.

BRIEF SUMMARY OF THE INVENTION

A user interface system in accordance with one embodiment includes a plane registration module, a gesture and posture recognition (GPR) module, a region definition module, and a mode determination module. The plane registration module is configured to identify a first plane within an environment. The GPR module is configured to observe a first allocation gesture, a second allocation gesture, a first modal gesture, a second modal gesture, and a third modal gesture within the environment. A region definition module is configured to determine a first region comprising a first portion of the first plane based on the first allocation gesture, and to determine a second region comprising a second portion of the first plane based on the second allocation gesture. A mode determination module is configured to determine a first interaction mode of the first region based on the first modal gesture, determine a first interaction mode of the second region based on the second modal gesture, and to determine a second interaction mode of the first region based on the third modal gesture, wherein the first interaction mode of the first region and the second interaction mode of the first region are different. A visual feedback module including visual feedback circuitry, the visual feedback module configured to provide visual feedback associated with a parameter of the first region.

A user interface method in accordance with one embodiment includes: identifying a first plane within an environment; observing a first allocation gesture, a second allocation gesture, a first modal gesture, a second modal gesture, and a third modal gesture within the environment; determining a first region comprising a first portion of the first plane based on the first allocation gesture; determining a second region comprising a second portion of the first plane based on the second allocation gesture; determining a first interaction mode of the first region based on the first modal gesture; determining a first interaction mode of the second region based on the second modal gesture; determining a second interaction mode of the first region based on the third modal gesture, wherein the first interaction mode of the first region and the second interaction mode of the first region are different; and providing, via a processor, visual feedback associated with a parameter of the first region.

BRIEF DESCRIPTION OF DRAWINGS

The present invention will hereinafter be described in conjunction with the appended drawings, where like designations denote like elements, and.

DETAILED DESCRIPTION OF THE INVENTION

The following detailed description presents a number of example embodiments and is not intended to limit the invention or the application and uses of the invention. Furthermore, there is no intention to be bound by any expressed or implied theory presented in the preceding technical field, background, brief summary, or the following detailed description.

Various embodiments of the present invention provide input devices and human-computer interaction (HCI) methods that facilitate improved usability. Such input devices may be roughly classified as "physical" or "virtual," as described in further detail below; however, it will be appreciated that some input devices may include both physical and virtual aspects. Accordingly, it is helpful to first discuss the nature of an example input device.

Figure 1:
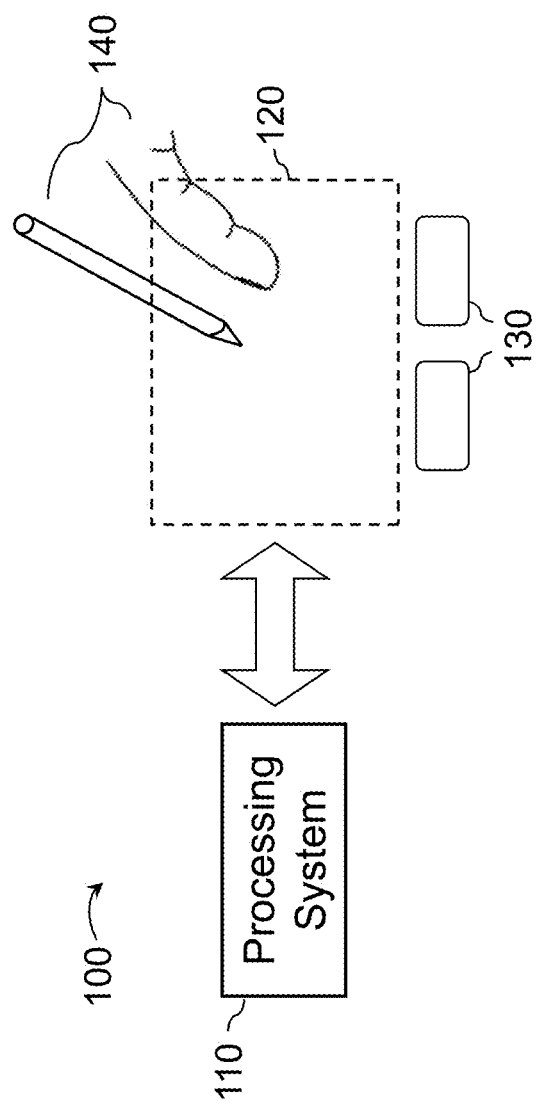
FIG. 1 is a block diagram of an example system that includes an input device useful in describing various embodiments.

FIG. 1 is a block diagram of an example input device 100 (i.e., a physical input device), in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be substantially uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

The pattern of sensor electrodes may be arranged substantially parallel to each other, substantially perpendicular to each other, or arranged in any other suitable pattern. Sensor electrodes are typically ohmically isolated from each other. In some embodiments, such sensor electrodes are separated from each by one or more substrates. For example, they may be disposed on opposite sides of the same substrate, or on different substrates that are laminated together. Some sensor electrodes may be configured as receiver electrodes, while other sensor electrodes are configured as transmitter electrodes. The capacitive coupling between the transmitter electrodes and receiver electrodes change with the proximity and motion of input objects in the sensing region associated with the transmitter electrodes and receiver electrodes.

The receiver sensor electrodes may be operated singly or multiply to acquire resulting signals. The resulting signals may be used to determine a "capacitive frame" representative of measurements of the capacitive couplings. Multiple capacitive frames may be acquired over multiple time periods, and differences between them used to derive information about input in the sensing region. For example, successive capacitive frames acquired over successive periods of time can be used to track the motion(s) of one or more input objects entering, exiting, and within the sensing region.

Referring again to FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, as described in further detail below, a processing system for a mutual capacitance sensor device may comprise transmitter circuitry configured to transmit signals with transmitter sensor electrodes, and/or receiver circuitry configured to receive signals with receiver sensor electrodes).

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. In one embodiment, processing system 110 includes determination circuitry configured to determine positional information for an input device based on the measurement.

"Positional information" as used herein broadly encompasses absolute position, relative position, velocity, acceleration, and other types of spatial information. Example "zero-dimensional" positional information includes near/far or contact/no contact information. Example "one-dimensional" positional information includes positions along an axis. Example "two-dimensional" positional information includes motions in a plane. Example "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
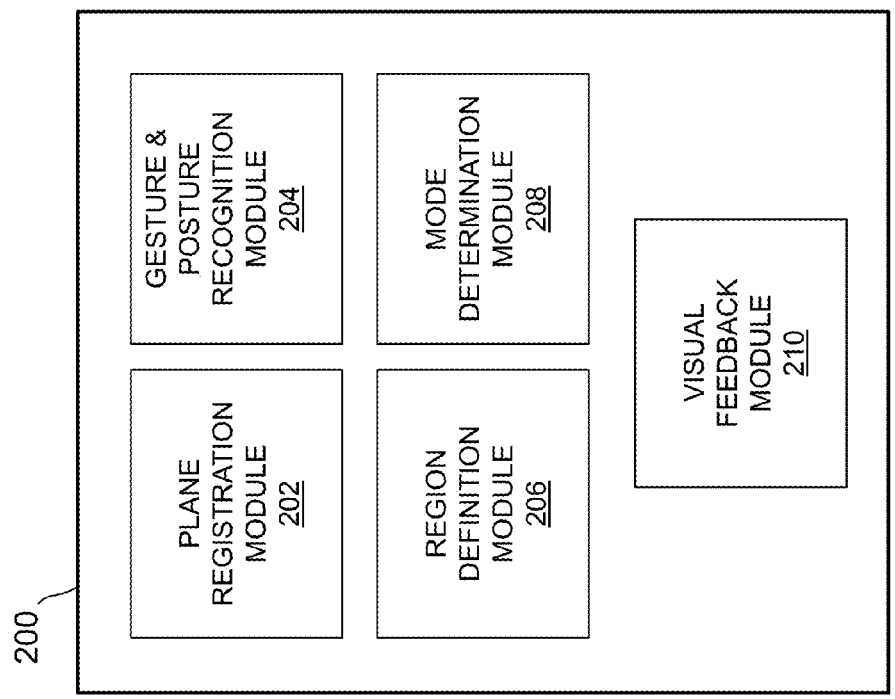
FIG. 2 is a conceptual block diagram depicting an example user interface system in accordance with various embodiments.

FIG. 2 is a conceptual block diagram of a user interface system (or simply "system") 200 in accordance with one embodiment. In general, user interface system 200 includes a plane registration module 202, a gesture and posture recognition module (or "GPR module") 204, a region definition module 206, a mode determination module 208, and a visual feedback module 210. In this regard, the various modules that compose system 200 may be implemented in any combination of hardware and software, and may be incorporated into the processing system 110 of FIG. 1 or included in whole or in part in one or more another processing systems (not illustrated).

Operation of user interface system 200 of FIG. 2 will now be described in conjunction with FIG. 3, which depicts an example environment within a three-dimensional space (denoted by the Cartesian axes in FIG. 3). The environment depicted in FIG. 3 may correspond, for example, to an office environment, a vehicle environment, an aircraft environment, or any other environment in which user interface systems may be employed.

Plane registration module 202 includes any combination of hardware and/or software configured to identify planes within an environment. For example, plane registration module 202 might include one or more cameras, one or more projectors and/or lasers (e.g., to project images onto an identified plane), one or more distance sensors (e.g., to determine points comprising a plane), one or more motion sensors, one or more microphones, one or more processors (e.g., CPUs or microcontrollers), and suitable software configured to operate those components. In the interest of simplicity, such components are not illustrated in FIG. 3. Plane registration module 202 may be configured to identify planes within the environment automatically or with the assistance of a user (i.e., through a "registration" process), as described in further detail below.

Methods and systems for determining the shapes of objects in an environment (e.g., identifying substantially planar surfaces) are well-understood, and need not be described in further detail herein. For example, certain systems such as Microsoft's KINECT system as well as open-source alternatives to KINECT are widely available and have well-documented application programming interfaces (APIs).

Figure 3:
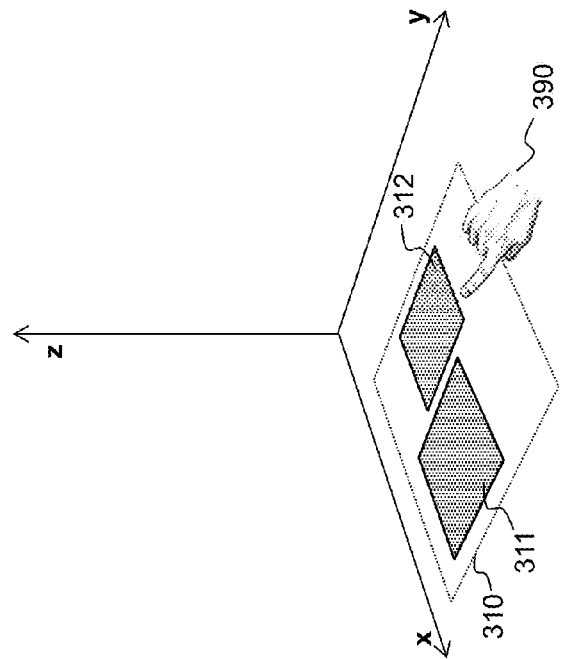
FIG. 3 is a conceptual diagram depicting operation of a user interface system in accordance with one embodiment.

Referring now to FIG. 3, a plane 310 has been identified by plane registration module 202. In this figure (as well as the figures that follow) plane 310 is denoted by a dotted rectangle; however, it will be understood that this is merely a standard graphical convention, and that in practice plane 310 will typically extend outward in one or more directions. In this regard, plane registration module 202 may be configured to determine a boundary within plane 310. For example, if plane 310 is identified as substantially corresponding to the top of a desk, a boundary of the desk within plane 310 may be determined. While FIG. 3 depicts a single horizontal plane 310, any number of other planes may be identified in a particular environment, as described in further detail below. The identified planes need not correspond to strictly planar surfaces. Surfaces with slight curvature or other insignificant non-planarities may also be identified, as may substantially planar portions of otherwise curvilinear or non-planar surfaces (e.g., a substantially planar region of the user's body).

GPR module 204 includes any combination of hardware and/or software configured to observe allocation gestures and modal gestures made by a user (e.g., input object 390, illustrated without loss of generality as a human hand) within the environment. As used herein, the term "gesture" or "gestural" refers to the movement of an input object, such as one or more body parts and/or one or more non-anatomical objects (such as a stylus or the like). Gestures include, for example, hand sweeps, finger traces, "pinch" movements, and the like. In contrast, the term "posture" or "postural" refers to the configuration of an input object, irrespective of its movement. Postures include, for example, an "L"-shape formation made with the thumb and index finger, a clenched fist, facial expressions, and the like. In this regard, the term "gesture" may be used without loss of generality to refer to both gestures and postures in some instances. For example, in cases where an action takes place in response to a particular gesture (e.g., a modal gesture), in some contexts that action may also take place in response to a particular posture. In addition, it will be appreciated that some user movements might include both postural and gestural components (e.g., moving a hand while altering its finger configuration).

The term "modal" as used in connection with a gesture or posture refers to an indication of a desired interaction mode. Such interaction modes include, for example, a touch input mode (e.g., a touchpad), a key-press interaction mode (e.g., a number key or keyboard entry mode), a handwritten text interaction mode, and a display output mode (e.g., resulting in the display of information on a plane). The invention is not so limited, however, and comprehends a wide range of interaction modes traditionally used in connection with user interfaces.

The term "allocation" as used in connection with a gesture or posture refers to an indication of how a plane should be allocated for subsequent interaction. A plane may, for example, be split by a boundary into a pair of adjacent regions. Alternatively, multiple discrete regions may be defined, as further detailed below.

The present invention comprehends that a wide range of gestures and postures may be used for determining interaction modes and for allocation of a plane. In one embodiment, referring briefly to FIG. 9, a wiping motion 902 made by a hand 390 (or other object) may be used as an allocation gesture. In another embodiment, referring briefly to FIG. 12, an "L"-shape made by the thumb 1220 and index finger 1210 of hand 1201 may be used for allocation posture. In one embodiment, referring briefly to FIG. 10, a user may use the finger of a hand 390 to draw an "a" character 1002 (or any other character) to indicate a text entry interaction mode. Similarly, referring briefly to FIG. 11, a roughly rectangular region 1102 may be traced out to indicate a touch input mode. In other embodiments, modal gestures and allocation gestures may be characters associated with particular languages (e.g., Chinese characters, katakana characters, Cyrillic characters, or the like). More generally, gestures may have shapes that are similar to, evocative of, or otherwise associated with a particular type of input system. For example, a circle gesture might indicate a steering wheel input, a cross might indicate a direction pad ("D-pad") game input, the movement of fingers as if they were on sliders might indicate an audio mixer input, and the drumming of fingers might indicate a drum or keyboard input. In general, an appropriate gesture or posture might be mapped to any input surface or instrument panel. Therefore, it will be appreciated that the particular gestures and/or postures shown in FIGS. 9-12 are not intended to be limiting, but are merely provided by way of example.

Referring again to FIGS. 2 and 3, GPR module 204 is generally configured to observe allocation gestures made by a user within the planes identified by plane registration module 202. In that regard, GPR module 204 is preferably configured to ignore or otherwise disregard allocation gestures and modal gestures made in space at locations that are not sufficiently close to or do not substantially fall within the identified planes (otherwise known as "false-positives"). The determination of whether a gesture is sufficiently close to an identified plane 310 may be predetermined or user-configurable. Furthermore, to prevent additional false-positives, the user may be able to specify (e.g., through a plane "registration" process) that certain identified planes not be considered for allocation or interaction.

Referring again to FIGS. 2 and 3, GPR module 204 may be configured to observe any number of modal gestures and allocation gestures. In accordance with the illustrated example, it will be assumed that GPR module 204 observes at least a first allocation gesture, a second allocation gesture, a first modal gesture, a second modal gesture, and a third modal gesture.

Region definition module 206 includes any combination of hardware and/or software configured to determine a first interactive region (or simply "region") comprising a first portion of a plane based on the first allocation gesture, and to determine a second region comprising a second portion of the plane based on the second allocation gesture. Referring to FIG. 3, for example, first region 311 comprises a portion of plane 310, and second region 312 also comprises a portion of plane 310. While regions 311 and 312 are shown as generally rectangular, they may have a variety of shapes. For instance, if plane 310 were to correspond, generally, to the surface of a desk, regions 311 and 312 might extend to one or more corners of that desk. Furthermore, regions 311 and 312 may be adjacent (i.e., having no significant space in plane 310 therebetween) but separated by a defined boundary. GPR module 204 is preferably configured to disregard modal gestures that are made by a user within a defined plane (e.g., plane 310) but which fall outside a defined region (e.g., outside of regions 311 and 312).

Mode determination module 208 includes any combination of hardware and/or software configured to determine a first interaction mode of the first region 311 based on the first modal gesture, determine a first interaction mode of the second region 312 based on the second modal gesture, and to determine a second interaction mode (different from the first interaction mode) of the first region 311 based on the third modal gesture. Stated another way, mode determination module 208 is configured such that regions 311 and/or 312 may be changed from one interaction mode to another through the use of the corresponding appropriate modal gestures. Mode determination module 208 may include one or more libraries or look-up tables that provide a list of all possible (or authorized) gestures and postures. This library may be pre-determined and/or configurable by the user. That is, the user may change or add additional gestures and postures.

Visual feedback module 210 includes any combination of hardware and/or software configured to provide visual feedback associated with a parameter of region 311 and/or 312. That is, as described in further detail below, visual feedback module 210 provides the user with some form of visual feedback regarding the function, shape, or nature of the defined regions. For example, the visual feedback might be associated with the boundary between regions 311 and 312 or the interaction mode of region 311 (i.e., whether it is in key-press mode or touch pad mode). The visual feedback may be provided on a display (e.g., a small display overlay positioned near the corner) or through any other convenient display system.

The modules illustrated as part of user interface system 200 may be incorporated into separate systems (e.g., with different housings) or consolidated into a single system. Furthermore, in some embodiments the illustrated modules may share physical components. For example, visual feedback module 210, plane registration module 202, and GPR module 204 may share certain components such as cameras, distance sensors, projection display components, and the like.

Having thus given a general overview of systems and methods in accordance with one embodiment, FIGS. 4-8 provide a more detailed, sequential illustration of the operation of a user interface system in accordance with one embodiment. FIGS. 4-8 will now be described in conjunction with the block diagram of FIG. 2.

Figure 4:
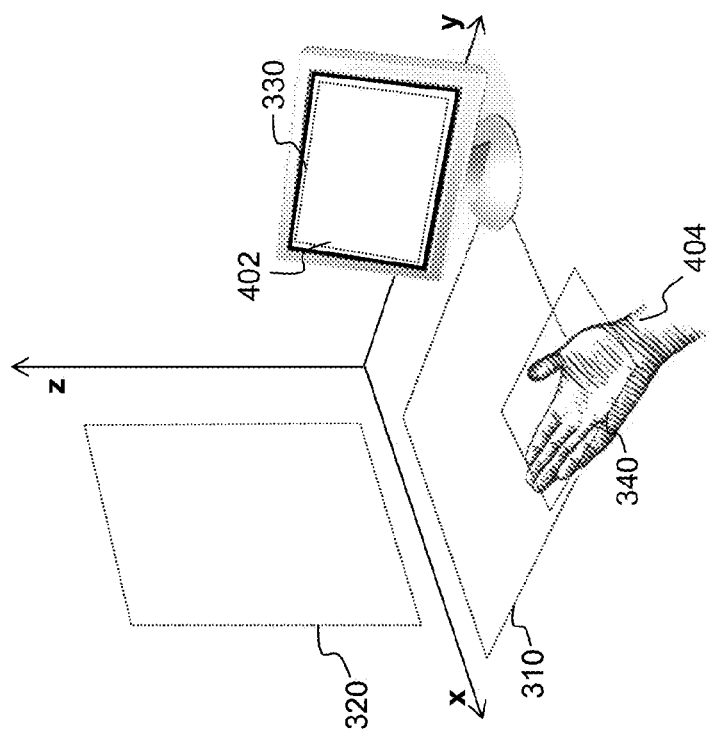

First, in FIG. 4 plane registration module 202 has identified four planes: plane 310 (corresponding to a desk surface, not shown), plane 320 (substantially corresponding to the surface of a wall perpendicular to plane 310), plane 330 (substantially corresponding to the surface of a computer monitor 402), and plane 340 (substantially corresponding to the palm of the user's hand 340). As mentioned previously, not all of the identified planes will ultimately be used as interaction regions by the user. Computer monitor 402 may also be used to interact with the user during operation of user interface system 200 (e.g., allocation and mode selection) as described in further detail below.

Figure 5:
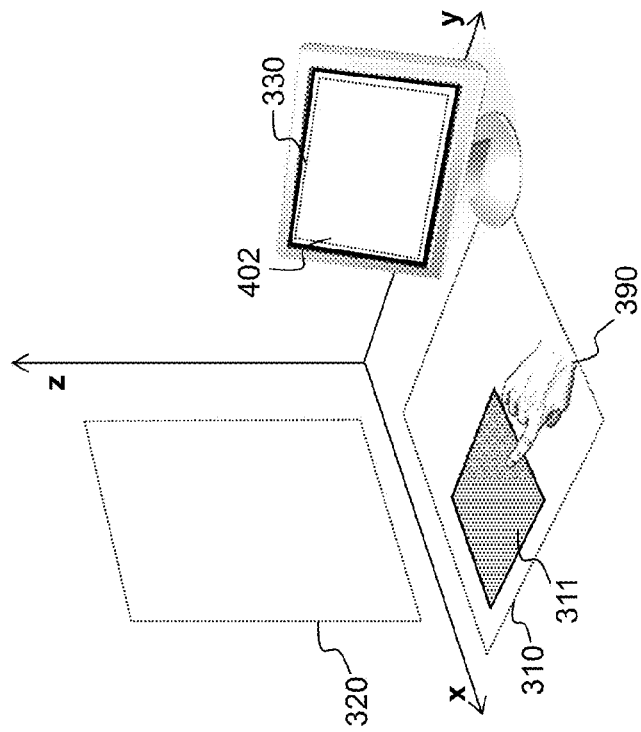
FIGS. 4-8 are conceptual diagrams depicting operation of a user interface system in accordance with various embodiments.

In FIG. 5, the user has performed an allocation gesture via hand 390 within plane 310, and region definition module 206 has consequently determined that region 311 is to be used for interaction. Furthermore, it is assumed that the user has performed a modal gesture that mode determination module 208 has interpreted to mean that region 311 is to be used thereafter for a specific interaction mode (e.g., a key-press interaction mode). In some embodiments, an allocation gesture is not required, or is implied by a particular modal gesture. That is, a single gesture or posture may function to provide information regarding both allocation and mode of a region.

Figure 6:
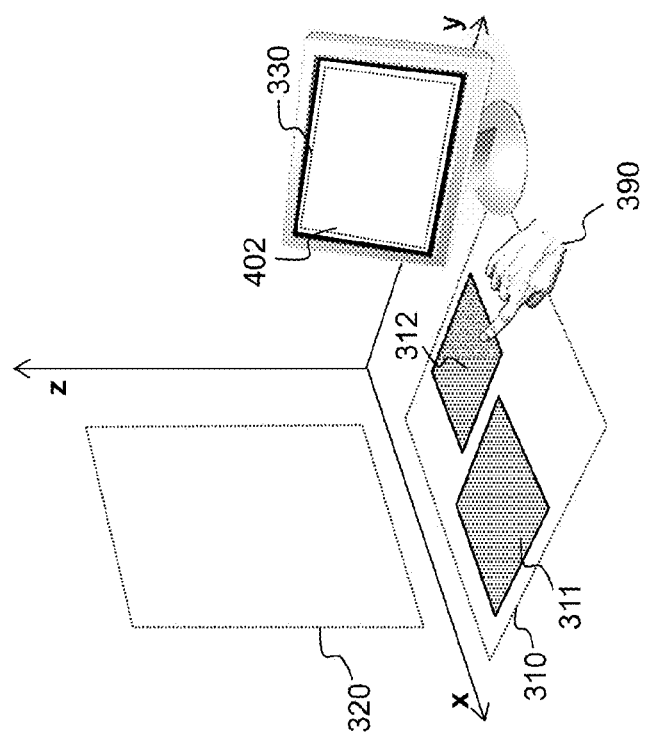

In FIG. 6, the user has performed an allocation gesture via hand 390 within plane 310, and region definition module 206 has consequently determined that region 312 is to be used for interaction. Furthermore, as with region 311 above, it is assumed that the user has performed a modal gesture that mode determination module 208 has interpreted to mean that region 312 is to be used thereafter for a specific interaction mode (e.g., a touch input interaction mode). Subsequently, the user may perform another modal gesture within region 312 that changes the interaction mode for that region to a different interaction mode (e.g., a display output mode).

Figure 7:
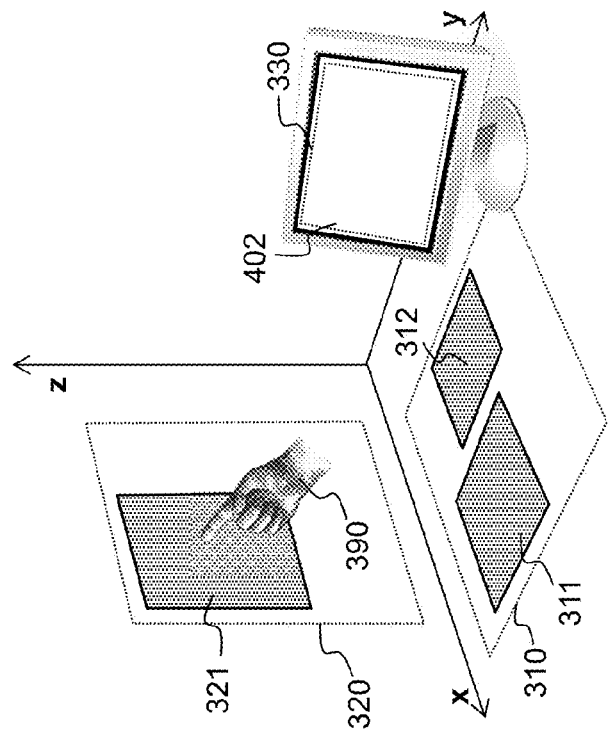

In FIG. 7, the user has performed an allocation gesture via hand 390 within a second plane (plane 320) and region definition module 206 has determined that region 321 is to be used for interaction. Plane 320 is non-parallel to plane 310. At this point, there are no regions defined within plane 330, and thus only regions 311, 312, and 321 will subsequently be used for interaction unless the user subsequently performs the above process with respect to plane 330 or any other plane that is later identified within the environment.

In accordance with one embodiment, GPR module 204 is configured to observe a termination gesture made by the user, and region definition module 206 is configured to de-allocate the first region based on the termination gesture. This may be used by the user, for example, when the defined region (e.g., region 321) is no longer needed for interaction. A variety of termination gestures may be used, including, for example, a large "X"-shape gesture, a grasping gesture, or a crumpling gesture.

In accordance with another embodiment, GPR module 204 is configured to observe a relocation gesture made by the user, and region definition module 206 is configured to change a geometrical attribute of the first region based on the relocation gesture. This may be used, for example, when the user wishes to move the defined region (e.g., region 321) to a different portion of plane 310, or to change the size, orientation, or shape of region 321. A variety of relocation gestures may be used, including, for example, a pinching gesture made by a pair of fingers, a two-handed grabbing/carrying motion, or a grasping gesture.

Figure 8:
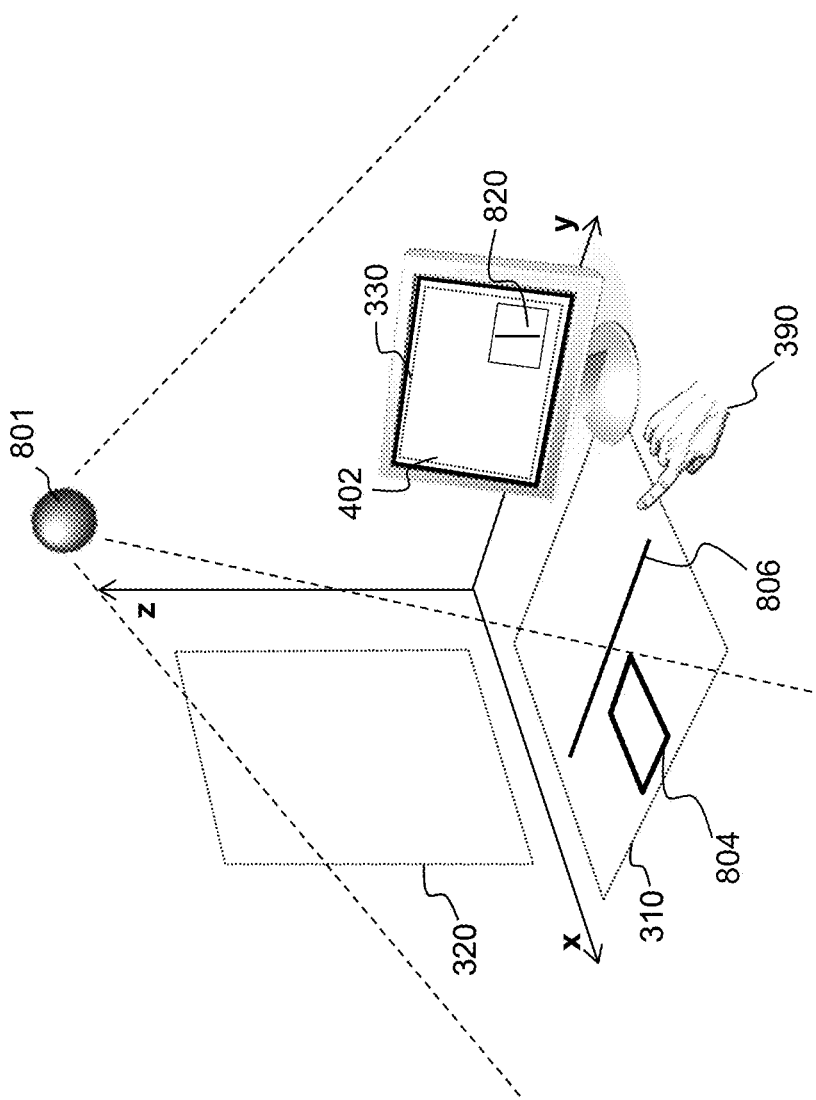
Figure 9:
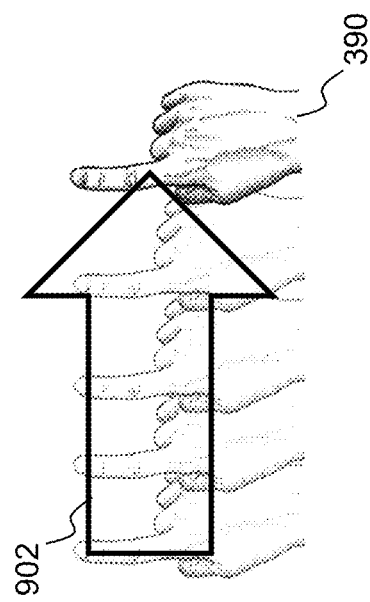
FIGS. 9-14 depict example gestures and/or postures used in connection with various embodiments.
Figure 11:
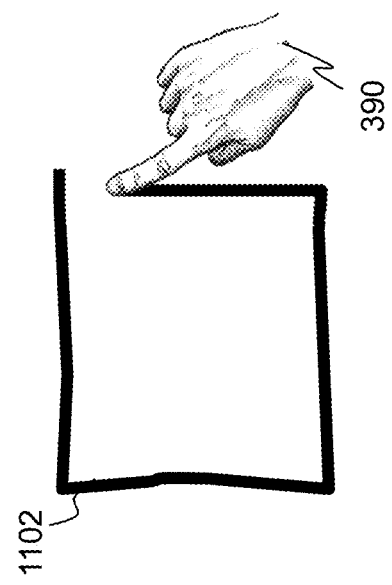
Figure 10:
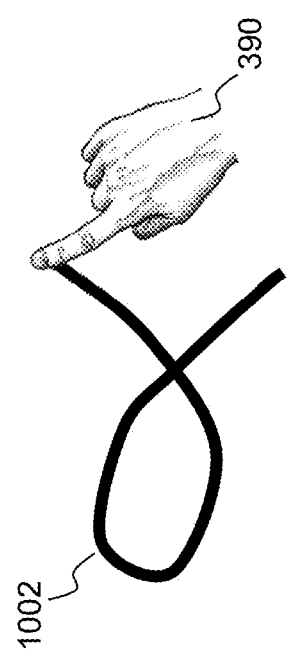

As mentioned above, visual feedback module 210 includes any combination of hardware and/or software configured to provide visual feedback associated with one or more parameters of region 311 and/or 312. Referring to FIG. 8, this functionality will be illustrated in more detail.

In FIG. 8, an exemplary device 801 is shown schematically as a sphere positioned above planes 310 and 320. Device 801 as illustrated is not intended to be limiting in shape or location, but is merely meant to represent (conceptually) hardware that may be used by visual feedback module 210 and/or the other modules within user interface 200. For example, in the illustrated embodiment, device 801 includes a projection device (as is known in the art) configured to project an arbitrary image on one or more of the surfaces corresponding to planes 310, 320, and 330. Thus, visual feedback module 210 is configured to provide a projection 804 on or near plane 310 that indicates the interaction mode of a region defined within plane 310 (e.g., region 311 of FIG. 7). In other embodiments, a virtual reality and/or augmented reality device may be employed by the user for this purpose (e.g., Google Glasses).

The rectangular projection 804 might indicate, for example, a touch input interaction mode. Other projections, such as a projected keyboard, number pad, arrow keys, mixer board, instrument panel, or the like might also be used. Also illustrated in FIG. 806 is a projection 806 that indicates a boundary between two regions within plane 310 (e.g., regions 311 and 312 of FIG. 7). Such projections 804 and 806 would typically be helpful for the user to determine the location and mode of the defined regions, and would also help remind the user that such regions are defined (i.e., to prevent false-positives). Device 801 might also provide a variety of other projections that assist the user in, for example, the definition of regions and the determination of interaction modes for those regions.

Also illustrated in FIG. 8 is a user interface component (or "icon") 820 that is displayed (e.g., by any of the modules within user interface 200) on monitor 402. As with the projections produced by device 801, icon 820 may provide information to the user regarding the allocation of the identified planes as well as the interaction modes used for particular regions. In one embodiment, in accordance with an explicit plane registration protocol, icon 820 is used to reflect the shape and location of regions and planes defined within the environment. When the user provides an appropriate allocation gesture or posture within an identified plane, icon 820 blinks (or otherwise provides a visual notification) prompting the user to enter a modal gesture or the like to define a second region. Subsequently, icon 820 is changed to reflect the new allocation of regions within the plane.

Figure 12:
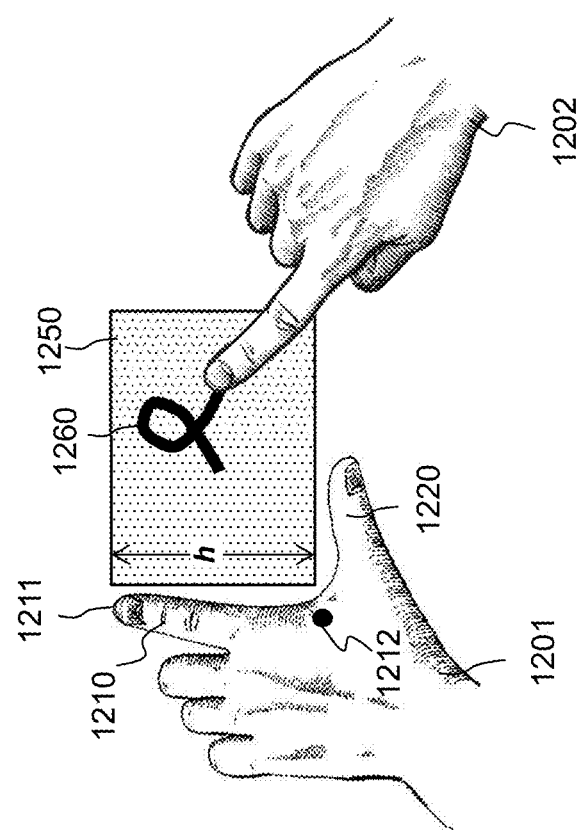

FIG. 12 presents a particular embodiment in which the user (via region definition module 206) defines a region 1250 using an allocation posture consisting of making an "L"-shape using the thumb 1220 and index finger (or other digit) 1210 of one hand (1201). The other hand (1201) can then be used to provide a modal gesture 1260 (in this case, a cursive "e" shape) that is used by mode determination module 208 to determine the interaction mode of region 1250 (e.g., a handwriting recognition, sketchpad, or text input mode). In some embodiments, as described briefly above, the "L" shape may function as both an allocation posture and a modal posture.

When the posture of hand 1201 is changed, or is removed from the plane in which region 1250 was defined, the region may or may not be de-allocated (i.e., no longer used for input). In some embodiments, the "L"-shape posture makes region 1250 "available" for input (i.e., without de-allocating the region). When hand 1201 is moved within the plane in which region 1250 was defined, region 1250 may be relocated to another location within the same plane. In another embodiment, hand 1201 may be used to create a different plane and region 1250 will remain defined. In yet another embodiment, a region modification gesture may be used by hand 1201 and/or hand 1202 to modify the shape, size, or orientation of region 1250.

Figures 13, 14:
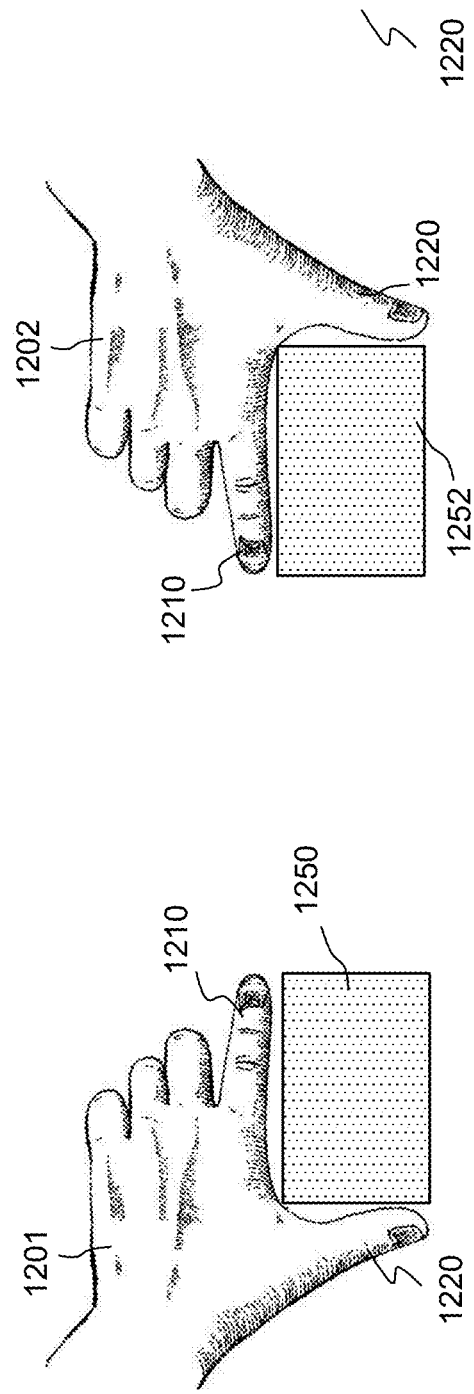

FIG. 12 illustrates a left hand oriented with the index finger 1210 pointing up (relative to the page). However, the invention is not so limited. In other embodiments, an allocation posture consists of an "L"-shape with index finger 1210 pointing in another orientation (e.g., to the right, as depicted in FIG. 13) to define a region 1251. Furthermore, the right hand may be used to create the "L"-shape and define a region 1252, as depicted in FIG. 14. In one embodiment, hand 1201 may be used for additional gestures during a particular interaction. For example, hand 1201 may "crumple" or otherwise change posture to indicate the completion of a multi-stroke character or to indicate a segmentation signal.

While region 1250 is illustrated as rectangular, the invention is not so limited. However, in one embodiment in which region 1250 is in fact substantially rectangular, one side of region 1250 has a length substantially equal to the length of the digit 1210. That is, as illustrated in FIG. 12, the height h of region 1250 is substantially equal to the distance between the distal portion 1211 of finger 1210 and a point 1212 near the proximal portion of finger 1210. More generally, the height h may be a linear function of the length of the digit (e.g., a linear function of that length). In other embodiments, the shape and size of region 1250 is predetermined (or user-configurable).

In summary, what has been described is a virtual user interface system in which multiple regions can be defined, modified, and de-allocated within a single plane, thereby allowing a user to make the best use of two-dimensional objects (such as a physical desk top) within the user's environment. Because gestures and postures made by the user within a defined planar region are easier to observe and interpret than those made in a three-dimensional space, the "live-mic" problem discussed above can be avoided. Furthermore, a user accustomed to interacting with physical user interface devices, such as touchpads and the like, can replicate that experience through the use of similar, virtual devices, which are easy to configure depending on user needs. Furthermore, a user may easily reprogram a plane and use it immediately if its modality has been forgotten by the user. In some embodiments, the users may define a default setting for the various regions and planes in the case that the work environment stays unchanged for a sufficient length of time.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A user interface system comprising:
a plane registration module, the plane registration module configured to identify a first plane within an environment;
a gesture and posture recognition (GPR) module, the GPR module configured to observe a first allocation gesture, a second allocation gesture, a first modal gesture, a second modal gesture, and a third modal gesture within the environment;
a region definition module, the region definition module configured to:
determine, as defined by the first allocation gesture, a first region comprising a first portion of the first plane, and
determine, as defined by the second allocation gesture, a second region comprising a second portion of the first plane;
a mode determination module, the mode determination module configured to:
determine, as defined by the first modal gesture, a first interaction mode of the first region, the first interaction mode of the first region comprising a first plurality of commands for a user to interact with a device,
determine, as defined by the second modal gesture, a first interaction mode of the second region, the first interaction mode of the second region comprising a second plurality of commands for the user to interact with the device, and
determine, as defined by the third modal gesture, a second interaction mode of the first region, the second interaction mode of the first region comprising a third plurality of commands for the user to interact with the device,
wherein the first interaction mode of the first region and the second interaction mode of the first region are different, wherein the first interaction mode and the second interaction mode are each at least one selected from a group consisting of a touch input mode, a key-press interaction mode, and a handwritten text interaction mode; and
a visual feedback module including visual feedback circuitry, the visual feedback module configured to provide visual feedback associated with a parameter of the first region.

2. The user interface system of claim 1, wherein:
the plane registration module is configured to identify a second plane within the environment, wherein the first plane and the second plane are non-parallel;
the GPR module is configured to observe a third allocation gesture; and
the region definition module is configured to determine a third region comprising a first portion of the second plane based on the third allocation gesture.

3. The user interface system of claim 1, wherein the region definition module is configured to determine the first region based on an "L"-shaped allocation posture.

4. The user interface system of claim 1, wherein the first allocation gesture comprises a wiping motion.

5. The user interface system of claim 1, wherein the first interaction mode comprises a display output.

6. The user interface system of claim 1, wherein:
the GPR module is further configured to observe a termination gesture; and
the region definition module is further configured to de-allocate the first region based on the termination gesture.

7. The user interface system of claim 1, wherein:
the GPR module is further configured to observe a relocation gesture; and
the region definition module is configured to change a geometrical attribute of the first region based on the relocation gesture.

8. The user interface system of claim 1, wherein the parameter of the first region comprises a boundary between the first region and the second region.

9. The user interface system of claim 1, wherein the parameter of the first region comprises the first interaction mode.

10. The user interface system of claim 1, wherein the first plane corresponds to a portion of a human body.

11. A user interface system comprising:
a gesture and posture recognition (GPR) module, the GPR module configured to observe a first allocation posture and a first modal gesture within an environment;
a plane registration module, the plane registration module configured to identify, based on the first allocation posture, a first plane within an environment, the first allocation posture comprising a first digit of a hand and a second digit of the hand held substantially perpendicular to each other;

a region definition module, the region definition module configured to determine, as defined by the first allocation posture, a first region comprising a first portion of the first plane;

a mode determination module, the mode determination module configured to determine, based on the first modal gesture, a first interaction mode of the first region, the first interaction mode comprising a plurality of commands for a user to interact with a device, wherein the first interaction mode is at least one selected from a group consisting of a touch input mode, a key-press interaction mode, and a handwritten text interaction mode.

12. The user interface system of claim 11, wherein at least one of the size and the shape of the first region is based on a length of at least one of the first digit and the second digit.

13. The user interface system of claim 12, wherein the first region is a substantially rectangular region having a side substantially corresponding to the length of the first digit.

14. A user interface method comprising:
identifying a first plane within an environment;
observing a first allocation gesture, a second allocation gesture, a first modal gesture, a second modal gesture, and a third modal gesture within the environment;
determining, as defined by the first allocation gesture, a first region comprising a first portion of the first plane;
determining, as defined by the second allocation gesture, a second region comprising a second portion of the first plane;
determining, as defined by the first modal gesture, a first interaction mode of the first region, the first interaction mode of the first region comprising a first plurality of commands for a user to interact with a device;
determining, as defined by the first modal gesture, a first interaction mode of the second region, the first interaction mode of the second region comprising a second set of commands for the user to interact with the device;
determining, as defined by the first modal gesture, a second interaction mode of the first region, the second interaction mode of the second region comprising a third set of commands for the user to interact with the device, wherein the first interaction mode of the first region and the second interaction mode of the first region are different, wherein the first interaction mode and the second interaction mode are each at least one selected from a group consisting of a touch input mode, a key-press interaction mode, and a handwritten text interaction mode; and
providing, via a processor, visual feedback associated with a parameter of the first region.

15. The method of claim 14, further including:
identifying a second plane within the environment, wherein the first plane and the second plane are non-parallel;
observing a third allocation gesture; and
determining a third region comprising a first portion of the second plane based on the third allocation gesture.

16. The method of claim 14, further including:
if a termination gesture is observed, de-allocating the first region based on the termination gesture; and
if a relocation gesture is observed, changing a geometrical attribute of the first region based on the relocation gesture.

* * * * *